(12) United States Patent
Landrieve

(10) Patent No.: US 11,209,049 B2
(45) Date of Patent: Dec. 28, 2021

(54) ROLLING BEARING WITH ULTRASONIC DISTANCE SENSOR

(71) Applicant: AKTIEBOLAGET SKF, Gothenburg (SE)

(72) Inventor: Franck Landrieve, Fondettes (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 17/022,173

(22) Filed: Sep. 16, 2020

(65) Prior Publication Data

US 2021/0123479 A1    Apr. 29, 2021

(30) Foreign Application Priority Data

Oct. 24, 2019  (DE) .......................... 102019216422.6

(51) Int. Cl.
| | |
|---|---|
| *F16C 19/38* | (2006.01) |
| *F16C 19/56* | (2006.01) |
| *F16C 33/58* | (2006.01) |
| *G01S 15/08* | (2006.01) |
| *F16C 41/00* | (2006.01) |

(Continued)

(52) U.S. Cl.
CPC .......... *F16C 33/585* (2013.01); *F16C 19/381* (2013.01); *F16C 19/545* (2013.01); *F16C 19/56* (2013.01); *F16C 33/60* (2013.01); *F16C 41/00* (2013.01); *G01S 15/08* (2013.01); *F16C 2233/00* (2013.01); *F16C 2300/14* (2013.01)

(58) Field of Classification Search
CPC .... F16C 19/381; F16C 19/545; F16C 19/522; F16C 19/56; F16C 33/585; F16C 33/586; F16C 41/00; F16C 43/04; F16C 2300/14; F16C 2233/00; F16F 33/60; G01S 15/08; G01N 29/04; B66C 23/84; G01P 3/443; G01P 3/4815
USPC ....... 384/448, 564, 619; 324/207.15, 207.21, 324/209, 222; 73/862.332
See application file for complete search history.

(56) References Cited

U.S. PATENT DOCUMENTS

| | | | | |
|---|---|---|---|---|
| 4,798,299 A | * | 1/1989 | Bayer ..................... | B66C 23/84 |
| | | | | 212/282 |
| 5,074,677 A | * | 12/1991 | Andree ................... | F16C 19/52 |
| | | | | 384/448 |

(Continued)

FOREIGN PATENT DOCUMENTS

| | | | | |
|---|---|---|---|---|
| DE | 102005053335 A1 | * | 5/2007 | ............. G01B 17/02 |
| DE | 19640895 B4 | * | 7/2007 | ............. F16C 19/381 |

(Continued)

*Primary Examiner* — Marcus Charles
(74) *Attorney, Agent, or Firm* — J-Tek Law PLLC; Scott T. Wakeman; Mark A. Ussai

(57) ABSTRACT

A rolling bearing includes first and second rings each having an axial raceway and a radial raceway and axial rolling elements between the radial raceways and radial rolling elements between the axial raceways, the second ring having a protruding nose extending into an annular groove of the first ring, the nose having an axial cylindrical surface that forms the axial raceway of the second ring. Also at least one ultrasonic distance sensor mounted on the first ring in radial contact with the axial cylindrical surface of the nose and configured to emit radiation in a main radiation direction oriented towards a surface of the second ring that is inclined relative to a rotation axis of the rolling bearing.

13 Claims, 1 Drawing Sheet

(51) Int. Cl.
   *F16C 33/60*    (2006.01)
   *F16C 19/54*    (2006.01)

(56)            References Cited

U.S. PATENT DOCUMENTS

| | | | | |
|---|---|---|---|---|
| 5,971,619 | A * | 10/1999 | Bourgeois-Jacquet | ...................... F16C 19/166 384/448 |
| 6,113,276 | A * | 9/2000 | Bourgeois-Jacquet | ...................... F16C 19/362 324/207.25 |
| 7,481,620 | B2 * | 1/2009 | Kirsch | ................... F03D 80/70 415/229 |
| 8,376,622 | B2 * | 2/2013 | Claus | ...................... F16C 19/52 384/448 |
| 8,664,944 | B2 * | 3/2014 | Mitterreiter | ............. G01P 3/487 324/207.2 |
| 8,931,959 | B2 * | 1/2015 | Noirot | ................... F16C 33/583 384/455 |
| 9,951,819 | B2 * | 4/2018 | Capoldi | .................. F16C 23/08 |
| 9,989,090 | B2 * | 6/2018 | Capoldi | .................. F16C 29/08 |
| 10,030,710 | B2 | 7/2018 | Nicolas | |
| 10,041,545 | B2 | 8/2018 | Nicolas et al. | |
| 2009/0256551 | A1 | 10/2009 | Ito et al. | |
| 2016/0312835 | A1 * | 10/2016 | Nicolas | ................. F16C 41/007 |

FOREIGN PATENT DOCUMENTS

| | | | | |
|---|---|---|---|---|
| DE | 202012011902 U1 * | 1/2013 | ............. | F16C 19/52 |
| FR | 3041396 A1 | 3/2017 | | |
| WO | WO-2005116602 A1 * | 12/2005 | ............ | F16C 19/522 |
| WO | 2010028630 A1 | 3/2010 | | |

* cited by examiner

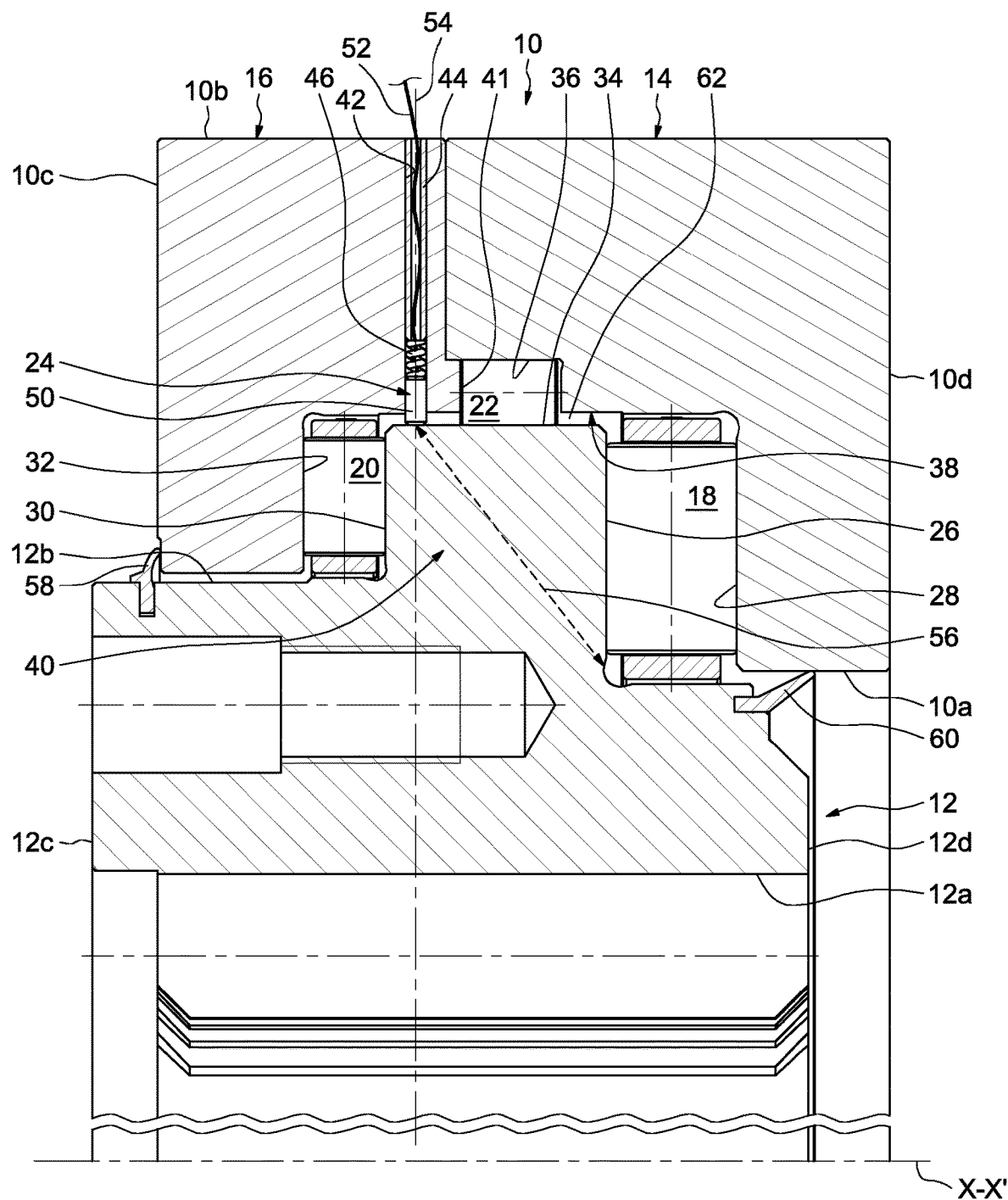

ROLLING BEARING WITH ULTRASONIC DISTANCE SENSOR

CROSS-REFERENCE

This application claims priority to German patent application no. 10 2019 216 422.6 filed on Oct. 24, 2019, the contents of which are fully incorporated herein by reference.

TECHNOLOGICAL FIELD

The present invention relates to the field of rolling bearings.

BACKGROUND

Large-diameter rolling bearings are known that can accommodate axial and radial loads, and that have an inner ring and an outer ring arranged concentrically about an axis of rotation running in an axial direction.

Such large-diameter rolling bearings may be used for example in a tunnel boring machine, in a mining extraction machine or in a wind turbine.

A large-diameter rolling bearing comprises two concentric inner and outer rings, and at least two rows of rolling elements, such as rollers, arranged between the rings. Such rolling bearings are generally loaded both axially and radially, often with relatively large loads. In this case, reference is made to an orientation roller bearing or a slewing roller bearing.

As a result of being subjected to heavy loads, parts of the rolling bearing, more particularly raceways of the rolling elements, tend wear out relatively quickly. The wear of the rings and rolling elements significantly increases the initial bearing clearance. Wear exceeding a certain value can lead to a dramatic bearing failure.

Measuring the wear of the bearing by measuring the clearance increase, which causes relative axial and radial displacement of the rings, helps to predict the residual life of the bearing.

Such unwanted movements affect proper functioning of the bearing and the application, with the risk that the bearing rings come in contact and collide. Other elements attached to the bearing rings may also collide.

It is common to replace the bearings when they are worn out. Such maintenance interventions are expensive, especially because of the downtime needed for the machines or facilities. It is therefore desirable that such maintenance interventions are timely performed before any contact occurs between the bearing rings, but not too long before the maintenance is required.

In order to monitor the bearing condition during its service life, the rolling bearing disclosed in patent application FR 3041396 A1 (a family member of U.S. Pat. No. 10,030,710 B2) comprises an annular magnetic target fixed to the inner ring and a sensor mounted on the outer ring and facing the magnetic target. Accordingly, axial and angular relative movements between the inner and outer rings can be detected.

However, this solution requires the installation of an annular magnetic target on a bearing inner ring that can be several meters in diameter.

Reference can also be made to the rolling bearing disclosed in U.S. Pat. No. 10,041,545 B2 which includes an encoder provided with a magnetic strip portion attached in a flat manner against the outer ring and cooperating with a sensor fixed to the inner ring.

However, with such an arrangement, it is not possible to measure the axial relative movements between the inner and outer rings independently of the rotational position of the rings, but only when the outer ring is in a rotational position with the magnetic strip portion in front of the sensor of the inner ring.

Besides, with the use of such magnetic targets as disclosed in the above-mentioned documents, measurement of the axial displacement between the inner and outer rings is affected by the radial displacement. As a matter of fact, when measuring axial displacement of a magnetic target, the airgap between target and sensor varies with the radial relative movement between the rings, and this makes measurements less accurate or impossible to obtain.

SUMMARY

One aim of the present disclosure is to overcome these drawbacks.

The disclosure is directed to a rolling bearing comprising a first ring, a second ring, at least one row of axial rolling elements arranged between radial raceways provided on the rings, and at least one row of radial rolling elements arranged between axial raceways provided on the rings in order to form a radial thrust which can transmit radial forces.

The second ring comprises a protruding nose engaged into an annular groove of the first ring and provided with an axial cylindrical surface onto which is formed the axial raceway of the second ring.

According to a general feature, the rolling bearing further comprises at least one ultrasonic distance sensor mounted on the first ring and coming into radial contact with the axial cylindrical surface of the nose of the second ring onto which is formed the axial raceway.

The ultrasonic distance sensor has a main radiation direction of emitted and received sonic waves which is oriented towards a surface of the second ring inclined with respect to the rotation axis of the rolling bearing.

The terms "axial rolling elements" is understood to mean rolling elements adapted to accommodate axial loads whereas the terms "radial rolling elements" is understood to mean rolling elements adapted to accommodate radial loads.

This configuration allows axial relative displacements between the rings to be accurately detected regardless the rotational position of the rings. As a matter of fact, the axial positions of the inclined surface of the second ring relative to the first ring is detected by the ultrasonic distance sensor.

Otherwise, the ultrasonic distance sensor is in contact with the axial cylindrical surface of the nose forming the axial raceway of the ring making a good quality and lubricated surface for low friction during bearing rotation. Accordingly, no additional surface on the associated ring is needed for the measurement since this axial cylindrical surface of the nose is used. For example, the axial cylindrical surface of the nose may be ground.

Preferably, the rolling bearing further comprises a pre-stressing element disposed between the first ring and the ultrasonic distance sensor to maintain contact with the sensor and the axial cylindrical surface of the nose of the second ring onto which is formed the axial raceway.

The pre-stressing element exerts a permanent force on the ultrasonic distance sensor to ensure the radial contact with the nose of the second ring, notably in case of relative radial displacement between the rings. The pre-stressing element may comprise a spring.

Advantageously, the first ring comprises a radial through-hole inside which the ultrasonic distance sensor is at least partly disposed. The radial through-hole of the first ring may extend from an axial cylindrical surface located radially on the side opposite to the second ring, and opens on an opposite axial cylindrical surface of the first ring radially facing the axial cylindrical surface of the nose of the second ring onto which is formed the axial raceway.

Accordingly, the sensor is inserted into the radial through-hole and arranged in its final position in an easy way. The first ring may further comprise a plug sealing the through-hole.

The protruding nose of the second ring may be further provided with two opposite radial flanks delimiting axially the axial cylindrical surface, one of the radial flanks delimiting at least partly the radial raceway of the second ring.

In one embodiment, the rolling bearing comprises at least two rows of axial rolling elements each arranged between radial raceways provided on the rings, the two rows of axial rolling elements being disposed axially on each side of the nose of the second ring.

The present disclosure and its advantages will be better understood by studying the detailed description of a specific embodiment given by way of a non-limiting example and illustrated by the appended drawing.

BRIEF DESCRIPTION OF THE DRAWING

The FIGURE is a partial cross-section of a rolling bearing according to an embodiment of the present disclosure.

DETAILED DESCRIPTION

The rolling bearing as illustrated is a large-diameter rolling bearing comprising a first ring 10 and a second ring 12. In the illustrated example, the first ring 10 is the outer ring whereas the second ring 12 is the inner ring. The rolling bearing may for example be used in a tunnel boring machine, a wind turbine or any other applications using a large diameter rolling bearing.

The outer and inner rings 10, 12 are concentric and extend axially along the bearing rotation axis X-X' which runs in an axial direction. The rings 10, 12 are of the solid type.

The outer ring 10 is formed as a split ring and comprises a first ring 14 and a second ring 16 stacked one relative to the other in the axial direction. Each of the first and second rings 14, 16 of the outer ring is provided with a plurality of aligned through-holes (not shown) in order to be joined by fitting bolts.

In the illustrated example, the rolling bearing comprises two rows of axial rollers 18, 20 which are arranged between the outer and inner rings 10, 12 in order to form an axial thrust, and a row of radial rollers 22 which are arranged between the rings to form a radial thrust.

As will be described later, the rolling bearing also comprises an ultrasonic distance sensor 24 for detecting an axial relative displacement between the outer and inner rings 10, 12. In the illustrated example, the ultrasonic distance sensor 24 is mounted on the outer ring 10.

The rollers 18, 20, 22 of one row are identical to one another. Each roller 18, 20, 22 comprises a cylindrical outer rolling surface and two opposite frontal end surfaces delimiting the outer rolling surface. The axis of rotation of each roller 22 is parallel to the axis X-X' of the bearing and perpendicular to the axes of each of the rollers 18, 20. In the illustrated example, the axial length of the rollers 18 is larger than the axial length of the rollers 20. Alternatively, the axial length of the rollers 18 may be smaller than, or may be equal to, the axial length of the rollers 20.

The rollers 18 are arranged axially between annular radial raceways 26, 28 respectively formed on the inner and outer rings 12, 10. Each radial raceway 26, 28 has in cross section a straight internal profile in contact with the rolling surfaces of the rollers 18. The raceways 26, 28 face each other in the axial direction.

The rollers 20 are arranged axially between annular radial raceways 30, 32 respectively formed on the inner and outer rings 12, 10. Each radial raceway 30, 32 has in cross section a straight internal profile in contact with the rolling surfaces of the rollers 20. The raceways 30, 32 axially face each other. The rows of rollers 18, 20 are spaced apart from each other in the axial direction.

The rollers 22 are arranged radially between annular axial raceways 34, 36 respectively formed on the inner and outer rings 12, 10. Each axial raceway 34, 36 has in cross section a straight internal profile in contact with the rolling surfaces of the rollers 22. The raceways 34, 36 face each other in the radial direction. The row of rollers 22 is radially offset outwards with respect to the rows of rollers 18, 20. The row of rollers 22 is axially located between the rows of rollers 18, 20.

The outer ring 10 comprises an annular groove 38 opening in a radial direction inwardly towards the inner ring 12. The outer ring 10 comprises an inner stepped cylindrical bore 10a from which the groove 38 is formed. The outer ring 10 also comprises an outer cylindrical surface 10b which is radially opposite to the bore 10a. The outer ring 10 further comprises two opposite radial frontal surfaces 10c, 10d which axially delimit the bore 10a and the outer surface 10b of the ring.

The inner ring 12 comprises an annular protruding nose 40 engaging into the annular groove 38 of the outer ring. The nose 40 extends radially outwards.

The inner ring 12 comprises an inner cylindrical bore 12a and a stepped outer cylindrical surface 12b which is radially opposite to the bore 12a. In the illustrated example, the bore 12a of the inner ring is provided with a gear teeth (not referenced). The inner ring 12 further comprises two opposite radial frontal surfaces 12c, 12d which axially delimit the bore 12a and the outer cylindrical surface 12b. The protruding nose 40 protrudes radially from the outer cylindrical surface 12b.

The rows of rollers 18, 20 are arranged axially between the nose 40 of the inner ring and the groove 38 of the outer ring. The rows of rollers 18, 20 are disposed on each side of the nose 40 of the inner ring. The radial raceway 26 is located on the nose 40 and on a radial portion of the outer stepped cylindrical surface 12b of the inner ring. Alternatively, the radial raceway 26 may be completely located on the nose 40. The radial raceway 30 is located on the nose 40. The radial raceways 28, 32 are located on the groove 38 of the outer ring.

More precisely, a first radial flank of the nose 40 partly delimits the radial raceway 26 for the rollers 18. A first radial flank of the groove 38, which axially faces the first radial flank of the nose 40, delimit the radial raceway 28 for the rollers 18. A second flank of the nose 40 and a facing second flank of the groove 38 respectively delimit the radial raceways 30, 32 for the rollers 20. The opposite first and second flanks of the nose 40 axially delimit the nose. Similarly, the opposite first and second flanks of the groove 38 axially delimit the groove. Each of the first and second flanks of the nose 40 extends radially from the outer cylindrical surface 12b of the inner ring.

The row of rollers 22 is arranged radially between the nose 40 of the inner ring and the groove 38 of the outer ring.

The axial raceways 34, 36 are respectively located on the nose 40 and the groove 38. An outer cylindrical surface of the nose 40 delimits the axial raceway 34. The outer cylindrical surface of the nose 40 and the outer cylindrical surface 12b are radially offset. As a result, the axial raceway 34 and the outer cylindrical surface 12b are also radially offset. The outer cylindrical surface of the nose 40 extends axially between the opposite radial flanks of the nose.

An axial bottom of the groove 38 delimits the axial raceway 36. In the illustrated example, an annular slot 41 is formed in the bottom of the groove 38 and delimits the axial raceway 36. The axial raceway 36 radially faces the outer cylindrical surface of the nose 40 onto which is formed the axial raceway 34.

In the illustrated example, the inner ring 12 is made in one part. Alternatively, the inner ring 12 may be divided in the axial direction in at least two separate parts secured together. In another variant, the nose 40 may be made separately from the main part of the inner ring.

As previously mentioned, the outer ring 10 is divided in the axial direction in two separate parts, the first ring 14 and the second ring 16. The first and second rings 14, 16 delimit together the groove 38. The radial raceway 28 is located on the first ring 14 and the radial raceway 32 is located on the second ring 16 of the outer ring.

As previously mentioned, the ultrasonic distance sensor 24 is provided to detect an axial relative displacement between the outer and inner rings 10, 12. The ultrasonic distance sensor 24 radially comes into contact with the outer cylindrical surface of the nose 40 of the inner ring delimiting the axial raceway 34.

The outer ring 14 is provided with a radial through-hole 42 inside which the sensor 24 is partly located. The through-hole 42 extends from the outer surface 10b of the outer ring and opens on the bore 10a. The through-hole 42 radially faces the outer cylindrical surface of the nose 40 of the inner ring delimiting the axial raceway 34.

The sensor 24 is mounted into the through-hole 42 and protrudes radially into the radial space provided between the nose 40 of the inner ring and the groove 38 of the outer ring to radially come into contact with the nose. The sensor 24 is in direct contact with this outer cylindrical surface of the nose 40. Preferably, the shape of the through-hole 42 is complementary to that of the sensor 24.

In the illustrated example, the sensor 24 is axially located between the row of radial rollers 22 and the row of axial rollers 20 since the length of the outer cylindrical surface of the nose 40 left free by the rollers 22 is larger axially on this side. Alternatively, it could be possible to dispose the sensor 24 axially between the row of radial rollers 22 and the row of axial rollers 18.

The outer ring 10 further comprises a plug 44 which closes and seals the through-hole 42. The plug 44 is located radially into the through-hole 42. The plug 44 is secured inside the through-hole 42 by any appropriate means, for example by force-fitting. The plug 44 is flush with the outer cylindrical surface 10b of the outer ring 10.

The rolling bearing further comprises a spring 46 radially interposed between the plug 44 and the sensor 24. The spring 46 exerts a radial pre-stressing permanent (constant) force on the sensor 24 so as to ensure a constant contact between the sensor 24 and the outer cylindrical surface of the nose 40 of the inner ring. The spring 46 acts as a pre-stressing element. A first end of the spring 46 bears against the plug 44 and the opposite second end bears against the sensor 24. In the illustrated example, the spring 46 is a compression spring. Alternatively, it could be possible to provide other pre-stressing element to exert a permanent force on the sensor 24, for example an elastic washer, such as a Belleville washer.

The ultrasonic distance sensor 24 comprises a sensor body 50 mounted into the through-hole 42 of the outer ring, and radially comes into contact with the outer cylindrical surface of the nose 40 of the inner ring delimiting the axial raceway 34.

In the disclosed example, the ultrasonic distance sensor 24 also comprises an output connecting cable 52 for transmitting sensing data which extends outwards relative to the sensor body 50. The output cable 52 extends radially outwards. The plug 44 is provided with a through-opening (not referenced) through which the output cable 52 can pass. The output cable 52 connects the sensor 24 to a control unit (not shown) so as to transmit sensed measurements. Alternatively, the output cable may be omitted if a wireless sensor is used.

The sensor body 50 of the sensor has a longitudinal axis 54 extending radially. The axis 54 also forms the longitudinal axis of the sensor 24. As illustrated schematically by the arrows in dotted lines, the sensor 24 has a main radiation direction 56 of emitted and received sonic waves which is inclined with respect to the radial longitudinal axis 54 of the sensor. In other words, the radiation direction 56 forms an angle with the radial longitudinal axis 54. The radiation direction 56 of the sensor extends obliquely inwards.

In the illustrated example, the radiation direction 56 of the sensor is oriented towards an edge of the radial raceway 26 of the inner ring connected to a small-diameter portion of the outer cylindrical surface 12b. Accordingly, the axial relative displacement of the edge of the inner ring 12 relative to the outer ring 10 is detected by the sensor 24.

As a matter of fact, the sensor 24 emits sonic waves through the inner ring 12 which are reflected by the edge of the radial raceway 26 of the inner ring and received back in the sensor. The time elapsed between emitting and receiving is proportional to the distance of the edge of the radial raceway 26 of the inner ring, and thus allows the detection of the axial relative displacement axial of the edge relative to the outer ring 10. The sensor 24 allows at the same time the detection of cracks on the radial raceway 26 of the inner ring.

Alternatively, the radiation direction 56 of the emitted and received sonic waves by the sensor 24 may be oriented towards another zone of the radial raceway 26 for detecting axial positions of the inner ring 12 relative to the outer ring 14. In another variant, for example with a reduced axial length of the rollers 18, the radiation direction 56 of the sensor 24 may be directed towards the frontal radial surface 12d of the inner ring. More generally, the radiation direction 56 of the sensor 24 may be directed towards any surface of the inner ring 12 which is inclined with respect to the axis X-X' for detecting axial positions of the surface relative to the outer ring 14. For example, the surface may be a surface extending radially or extending obliquely with regard to the axis X-X'.

The rolling bearing further comprises on each side an annular seal 58, 60 mounted on the inner ring 12 and provided to close the radial space that exists between the rings 10, 12. This radial space is defined between the bore 10a of the outer ring, and the outer cylindrical surface 12b and the outer surface of the nose of the inner ring.

A closed space 62 is defined between the inner and outer ring 12, 14 and the seals 58, 60 in which the sensor 24 and the rows of rolling elements 18, 20 and 22 are housed.

Each seal 58, 60 is mounted into a groove (not referenced) formed on the outer cylindrical surface 12b of the inner ring and comes into contact with the outer ring 12. The seal 58 comes into contact with the radial frontal surface 10c of the outer ring. The seal 60 comes into contact with the bore 10a of the outer ring axially near the row of rollers 18. Alternatively, it could be possible to provide a reversed arrangement for at least one of the seals 58, 60 with the seal mounted on the outer ring 10 and coming into friction contact with the inner ring 12.

Otherwise, as previously mentioned, in this illustrated example, the first ring of the rolling bearing is the outer ring 10 whereas the second ring is the inner ring 12.

As an alternative, it could be possible to provide a reversed arrangement with the first ring forming the inner ring and the second ring forming the outer ring. In this case, the groove formed on the inner ring opens radially outwards and the nose of the outer ring extends radially inwards. The ultrasonic distance sensor is mounted on the inner ring and comes radially into contact with an axial inner cylindrical surface of the nose, which forms the bore of the nose, and onto which is formed the axial raceway of the outer ring.

In the described examples, the rolling bearing is provided with a rolling bearing comprising three rows of rolling elements. Alternatively, the rolling bearing may comprise only two rows of rolling elements, or four or more rows of rolling elements. In the illustrated example, the rolling elements are rollers. The rolling bearing may comprise other types of rolling elements, for example balls.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved rolling bearings.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A rolling bearing, comprising:
   a first ring having an axial raceway and a radial raceway,
   a second ring having an axial raceway and a radial raceway,
   at least one row of axial rolling elements arranged between the radial raceway of the first ring and the radial raceway of the second ring, and
   at least one row of radial rolling elements arranged between the axial raceway of the first ring and the axial raceway of the second ring,
   wherein the second ring includes a protruding nose extending into an annular groove of the first ring, the nose having an axial cylindrical surface, the axial raceway of the second ring being formed on the axial cylindrical surface of the nose, and
   wherein at least one ultrasonic distance sensor is mounted on the first ring in radial contact with the axial cylindrical surface of the nose, the ultrasonic distance sensor being configured to emit radiation in a main radiation direction oriented towards a surface of the second ring that is inclined relative to a rotation axis of the rolling bearing.

2. Rolling bearing according to claim 1, further comprising a pre-stressing element disposed between the first ring and the ultrasonic distance sensor to maintain contact between said sensor and the axial cylindrical surface of the nose.

3. The rolling bearing according to claim 2, wherein the pre-stressing element comprises a spring.

4. The rolling bearing according to claim 1, wherein the first ring comprises a radial through-hole and wherein the ultrasonic distance sensor is at least partly disposed in the through-hole.

5. The rolling bearing according to claim 4, wherein the radial through-hole extends from an axial cylindrical surface located radially on the side opposite to the second ring to an opposite axial cylindrical surface of said first ring radially facing the axial cylindrical surface of the nose of the second ring.

6. The rolling bearing according to claim 5, wherein the first ring further comprises a plug sealing the through-hole.

7. The rolling bearing according to claim 1, wherein the protruding nose of the second ring includes a first radial flank and a second radial flank axially delimiting said axial cylindrical surface, the first radial flank at least partly delimiting the radial raceway of said second ring.

8. The rolling bearing according to claim 7, wherein the at least one row of axial rolling elements comprises a first row of axial rolling elements on the first radial flank and a second row of axial rolling elements on the second radial flank.

9. The rolling bearing according to claim 1, wherein the axial cylindrical surface of the nose is ground.

10. The rolling bearing according to claim 1, wherein the first ring is an outer ring, and the second ring is an inner ring.

11. The rolling bearing according to claim 1, wherein the surface of the second ring is located radially inward of the at least one row of radial rolling elements.

12. The rolling bearing according to claim 11, wherein the surface of the second ring is located radially inward of the at least one row of axial rolling elements.

13. A rolling bearing, comprising:
   a first ring having an axial raceway and a radial raceway,
   a second ring having an axial raceway and a radial raceway,
   at least one row of axial rolling elements arranged between the radial raceway of the first ring and the radial raceway of the second ring, and
   at least one row of radial rolling elements arranged between the axial raceway of the first ring and the axial raceway of the second ring, wherein the second ring includes a protruding nose extending into an annular groove of the first ring, the nose having an axial cylindrical surface, the axial raceway of the second ring being formed on the axial cylindrical surface of the nose, and wherein at least one ultrasonic distance sensor is mounted on the first ring in radial contact with the axial cylindrical surface of the nose, the ultrasonic distance sensor being configured to measure a distance to a surface of the second ring that is inclined relative to a rotation axis of the rolling bearing.

\* \* \* \* \*